(12) United States Patent
Ogawa et al.

(10) Patent No.: US 8,110,944 B2
(45) Date of Patent: Feb. 7, 2012

(54) SWITCHING CIRCUIT AND POWER CONVERTER

(75) Inventors: Kazutoshi Ogawa, Hitachi (JP); Katsumi Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 173 days.

(21) Appl. No.: 12/707,180

(22) Filed: Feb. 17, 2010

(65) Prior Publication Data

US 2010/0207450 A1 Aug. 19, 2010

(30) Foreign Application Priority Data

Feb. 17, 2009 (JP) ................................. 2009-034219

(51) Int. Cl.
*H02J 1/10* (2006.01)
(52) U.S. Cl. ........................................................ 307/43
(58) Field of Classification Search .................... 307/43, 307/109, 126, 140, 141.4
See application file for complete search history.

(56) References Cited

FOREIGN PATENT DOCUMENTS

| JP | 08-051770 | 2/1996 |
|---|---|---|
| JP | 2007-288992 | 11/2007 |

*Primary Examiner* — Jared Fureman
*Assistant Examiner* — Carlos Amaya
(74) *Attorney, Agent, or Firm* — Antonelli, Terry, Stout & Kraus, LLP.

(57) ABSTRACT

The invention provides a switching circuit and a power converter having a built-in power source for a conduction control terminal even if they have a single-arm structure. In the switching circuit having a switching device and a conduction control terminal power source capacitor, a negative terminal of the capacitor is connected to a reference voltage terminal of a main power source and to the gate terminal selectively through a half-bridge circuit and a positive terminal of the capacitor is selectively connected to a positive terminal of the main power source and to a source terminal of the switching device through a half-bridge circuit. The capacitor is charged when the positive terminal is connected to the main power source and discharges when the negative terminal is connected to the gate terminal and the positive terminal is connected to the source terminal and applies voltage to the gate terminal of the switching device.

11 Claims, 6 Drawing Sheets

SWITCHING CIRCUIT AND POWER CONVERTER

CROSS REFERENCE TO RELATED APPLICATIONS

This application claims the foreign priority benefit under Title 35, United States Code §119(a)-(d) of Japanese Patent Application No. 2009-034219, filed on Feb. 17, 2009 in the Japan Patent Office, the disclosure of which is herein incorporated by reference in its entirety.

BACKGROUND OF THE INVENTION

1. Field of the Invention

The present invention relates to a switching circuit for use in a power converter such as an inverter, a converter, a chopper and the like. The present invention also relates to a power converter using one of them, and more specifically, relates to the switching circuit and the power converter suitable for use with a switching device having normally-on characteristics.

2. Related Art

A wide band-gap semiconductor device using a wide band-gap material such as silicon carbide and gallium nitride or diamond, e.g., a junction field effect transistor (JFET), a static induction type transistor (SIT), a metal-semiconductor field effect transistor (MESFET), a hetero-junction field effect transistor (HFET) and a high electron mobility transistor (HEMT), has excellent characteristics as a switching device. However, the switching device composed of such wide-band-gap semiconductor device has normally-on characteristics. That is, a predetermined negative voltage has to be applied to a conduction control terminal (gate or base) of the switching device composed of the wide-band-gap semiconductor to turn off the conduction control terminal.

So, in the switching circuit and the power converter using the aforementioned switching device, a predetermined negative voltage must be applied to turn off the switching device. One conceivable solution is to fabricate a circuit structure provided with a power source for the conduction control terminal, beside a main power source, to apply the negative voltage to the conduction control terminal. However, such a circuit structure inevitably encounter increase in size and cost because the power source for the conduction control terminal needs an additional area for its implementation. Desirably, a circuit structure that enables to reduce the size and cost may be provided by a built-in power source for supplying a negative voltage to the conduction control terminal.

As for built-in structure of the power source for the conduction control terminal of the switching device having the normally-on characteristics, there is known a method of forming the power source for the conduction control terminal by a capacitor and of charging the capacitor from the main power source as described in Japanese Patent Laid-open No. 2007-288992 for example. Japanese Patent Laid-open No. H8-51770 discloses another known example of built-in power supply structure for the conduction control terminal of the switching device.

In this method, a capacitor can be used effectively as the power source for the control terminal to reduce the size and cost of the switching circuit and power converter since a built-in structure is provided for supplying a negative voltage to the conduction control terminal of the switching device. However, applicable circuit structures are limited in the conventional built-in power source structure disclosed in Japanese Patent Laid-open No. 2007-288992.

That is, in the built-in power source structure disclosed in Japanese Patent Laid-open No. 2007-288992, electricity is charged to a power-supply capacitor, which is to supply a negative voltage to a gate of a lower arm switching device, from a power-supply capacitor, which is to supply a negative voltage to a gate of an upper arm switching device. Although this structure is applicable to a power converter having the circuit structure having the upper and lower aims such as an inverter and a converter, it is not applicable to a power converter such as a boost chopper (this structure will be referred to as a 'single-arm structure' tentatively in the present specification). So, this structure is not desirable for use in wide variety of circuit structures.

SUMMARY OF THE INVENTION

The present invention is made in view of the circumstances described above, and an object thereof is to provide a switching circuit and a power converter using the same for providing a built-in power source structure for a conduction control terminal regardless of whether it is a single-arm structure or a double-arm structure.

In the present invention, a power sources for a conduction control terminal are capacitors to which electricity is charged from a main power source the capacitors are disconnected from the switching device of the main circuit when the capacitor for the power source of the control terminal (referred to as a control terminal power source capacitor hereinafter) is charged by the main power source. In this structure, no charging current flows through the switching device of a main circuit. When voltage is applied to the conduction control terminal by the control terminal power source capacitor, the capacitors are connected to the switching device of the main circuit to apply voltage between the conduction control terminal and a low-voltage-side terminal of the switching device. This structure eliminates the switching device of the main circuit for charging electricity to the control terminal capacitor from the main power source and provides a built-in power source for the conduction control terminal even in the single-arm structure. Still more, the present invention can provide a suitable built-in power supply structure in which the charging current of the control terminal power source capacitor must not flow through the switching device of the main circuit.

Hereinafter, a gate terminal or a base terminal in the semiconductor switching device of the present invention will be referred to as a conduction control terminal, and an emitter terminal or a source terminal will be referred to as a low-voltage-side terminal.

The present invention provides a solution for the aforementioned disadvantages. Specifically, a switching circuit of the present invention includes: a main power source having a first power source terminal and a second power source terminal; a power source capacitor rechargeable with the main power source, the power source capacitor having a first terminal and a second terminal, the first terminal being connected with the first power source terminal, the second terminal being connected with the second power source terminal; a switching device, which has normally-on characteristics, having a conduction control terminal to which a voltage is applied with the power source capacitor, the switching device having a low voltage terminal; a first changeover switch for connecting the first terminal of the power source capacitor to the conduction control terminal if the connection to the conduction control terminal is selected in the first changeover switch; a second changeover switch for connecting the second terminal of the power source capacitor to the low voltage terminal if the connection to the low voltage terminal is selected in the second changeover switch; and a diode connected between the second terminal of the power source capacitor and the low voltage terminal, wherein the power source capacitor is rechargeable by disconnecting the first terminal of the power source capacitor and by connecting the second terminal of the power source capacitor to the main power source, and wherein the power source capacitor applies a voltage to the conduction control terminal by connecting the first terminal of the power source capacitor to the conduction control terminal and by connecting the second terminal of the power source capacitor to the low voltage terminal.

In the switching circuit as described above, it is normally necessary to generate the voltage suitably applied to the conduction control terminal from the main power source. So it is preferable that the switching circuit further includes a voltage generating circuit for generating the voltage applied to the conduction control terminal with the main power source, wherein the conduction control terminal power source capacitor is recharged with the voltage generating circuit.

It is preferable to form the changeover switch in the switching circuit as described above by a half-bridge circuit for simplifying the circuit structure. So it is preferable that the first and second changeover switches function as half-bridge circuits.

While a driving power source is required in forming the changeover switch by the half-bridge circuit, it is also preferable to self-supply by using a capacitor. So it is preferable that the switching circuit further includes half-bridge power capacitors, rechargeable with the main power source, for driving the first and second changeover switches.

When the switching circuit as described above is applied to a power converter having upper and lower arms and when the switching devices have the normally-on characteristics, the switching devices of the upper and lower arms may fall into a short-circuit state in a state in which a required voltage is not assured in the control terminal power source capacitor. And if the switching devices of the upper and lower arms are connected to the main power source in the short-circuit state, the switching devices may be damaged. So it is preferable that the switching circuit further includes: a relay switch connected between the main power source and the switching device; and a relay control circuit for controlling operations of the relay switch, wherein the relay control circuit switches on the relay switch if a voltage in the power source capacitor satisfies a predetermined threshold value, or if a voltage in the half-bridge power capacitor of the first changeover switch meets a predetermined threshold value.

The invention also solves the problems related to the power converter based on the idea described above.

So it is preferable that a switching circuit includes: an upper arm and a lower arm; a main power source having a first power source terminal and a second power source terminal; power source capacitors, each provided in the upper and lower arms, each power source capacitor being rechargeable with the main power source, each power source capacitor having a first terminal and a second terminal, each first terminal being connected with the first power source terminal, each second terminal being connected with the second power source terminal; switching devices, which have normally-on characteristics, each provided in the upper and lower arms, each switching device having a conduction control terminal to which a voltage is applied by the power source capacitor, each normally-on switching device having a low voltage terminal; first changeover switches, each provided in the upper and lower arms, for connecting the first terminals of the power source capacitors to the conduction control terminals if the connections to the conduction control terminals are selected in the first changeover switches; second changeover switches, each provided in the upper and lower arms, for connecting the second terminals of the power source capacitors to the low voltage terminals if the connections to the low voltage terminals are selected in the second changeover switches; and diodes, each connected between the second terminal of the power source capacitor and the low voltage terminal in each arm, wherein the power source capacitors are rechargeable by disconnecting the first terminals of the power source capacitors and by connecting the second terminals of the power source capacitors to the main power source, and wherein the power source capacitors apply voltages to the conduction control terminals by connecting the first terminals of the power source capacitors to the conduction control terminals and by connecting the second terminals of the power source capacitors to the low voltage terminals.

The power converter described above is applied to the upper and lower arms of the power converter having the upper and lower arm structure. When the switching circuit described above is applied to the upper and lower arms like this case, it is preferable to arrange such that the control terminal power source capacitors of the upper and lower arms charge with each other. Thereby, the respective control terminal power source capacitors of the upper and lower arms may be operated also as charging sources for each other. That is, it is possible to charge one control terminal power source capacitor by the other control terminal power source capacitor and thereby to charge continuously. Thus, it is possible to prevent insufficient charging of the control terminal power source capacitors effectively even immediately after the capacitors discharged.

It is also possible to simplify the whole circuit structure of the power converter by differentiating the structure of the switching circuit in the upper and lower arms in applying the switching circuit described above to the power converter having the upper and lower arm structure.

So it is preferable that a switching circuit includes: an upper arm and a lower arm; a main power source having a first power source terminal and a second power source terminal; an upper arm switching device, which is a normally-on device, provided in the upper arm, the upper arm switching device having an upper arm conduction control terminal to which a voltage is applied by the power source capacitor, the upper arm switching device having a low voltage terminal; a lower arm switching device, which is a normally-on device, provided in the lower arm, the lower arm switching device having a lower arm conduction control terminal to which a voltage is applied by the lower arm power source capacitor, the lower arm switching device having a low voltage terminal; an upper arm power source capacitor, provided in the upper arm, the upper arm power source capacitor being rechargeable with the main power source, the upper arm power source capacitor having a first terminal and a second terminal, the first terminal of the upper arm power source capacitor being connected with the first power source terminal, the second terminal of the upper arm power source capacitor being connected with the second power source terminal through a diode and being connected to the low voltage terminal of the upper arm switching device; a lower arm power source capacitor, provided in the lower arm, the lower arm power source capacitor being rechargeable with the main power source, the lower arm power source capacitor having a first terminal and a second terminal, the first terminal of the lower arm power source capacitor being connected with the first power source terminal, the second terminal of the lower arm power source capacitor being connected with the second power source terminal through a diode and being connected to the low voltage terminal of the upper arm switching device; an upper arm switching device, which is a normally-on device, provided in the upper arm, the upper arm switching device having an upper arm conduction control terminal to which a voltage is applied by the power source capacitor, the upper arm switching device having a low voltage terminal; a lower arm switching device, which is a normally-on device, provided in the lower arm, the lower arm switching device having a lower arm conduction control terminal to which a voltage is applied by the lower arm power source capacitor, the lower arm switching device having a low voltage terminal; an upper arm changeover switch, provided in the upper arm, for connecting the first terminal of the upper arm power source capacitor to the conduction control terminal of the upper switching device if the connection to the conduction control terminal of the upper switching device is selected in the upper arm changeover switch; a lower arm first changeover switch, provided in the lower arm, for connecting the first terminal of the lower arm power source capacitor to the conduction control terminal of the lower arm normally-on switching device if the connection to the conduction control terminal of the lower switching device is selected in the lower arm first changeover switch; and a lower arm second changeover switch, provided in the lower arm, for connecting the second terminal of the lower arm power source capacitor to the low voltage terminal of the lower arm switching device via a lower arm diode if the connection to the low voltage terminal of the lower switching device is selected in the lower arm second changeover switch, wherein the upper arm power source capacitor discharges to apply a voltage to the conduction control terminal of the upper arm switching device by connecting the first terminal of low voltage terminal the upper arm power source capacitor to the conduction control terminal of the upper arm switching device, wherein the lower arm power source capacitor is charged by disconnecting the first terminal of the lower arm power source capacitor with the conduction control terminal of the lower arm normally-on switching device and by connecting the second terminal of the lower arm power source capacitor to the main power source, and wherein the lower arm power source capacitor discharges to apply a voltage to the conduction control terminal of the lower arm normally-on switching device by connecting the first terminal of the lower arm power source capacitor to the conduction control terminal of the lower arm normally-on switching device and by connecting the second terminal of the lower arm power source capacitor to the low voltage terminal of the lower arm power source capacitor.

In the power converter as described above, in the switching circuit, it is preferable that the second terminal of the upper arm power capacitor is connected to a second terminal of the main power source through the upper arm switching device. Thereby, the whole circuit structure may be more simplified.

The present invention described above provides a built-in structure for supplying a negative voltage to the conduction control terminal both in a single-arm structure and a double-arm structure in the switching circuit and the power converter using the same.

DETAILED DESCRIPTION OF THE INVENTION

Various embodiments of the invention will be explained as follows.

First Embodiment

Figure 1:
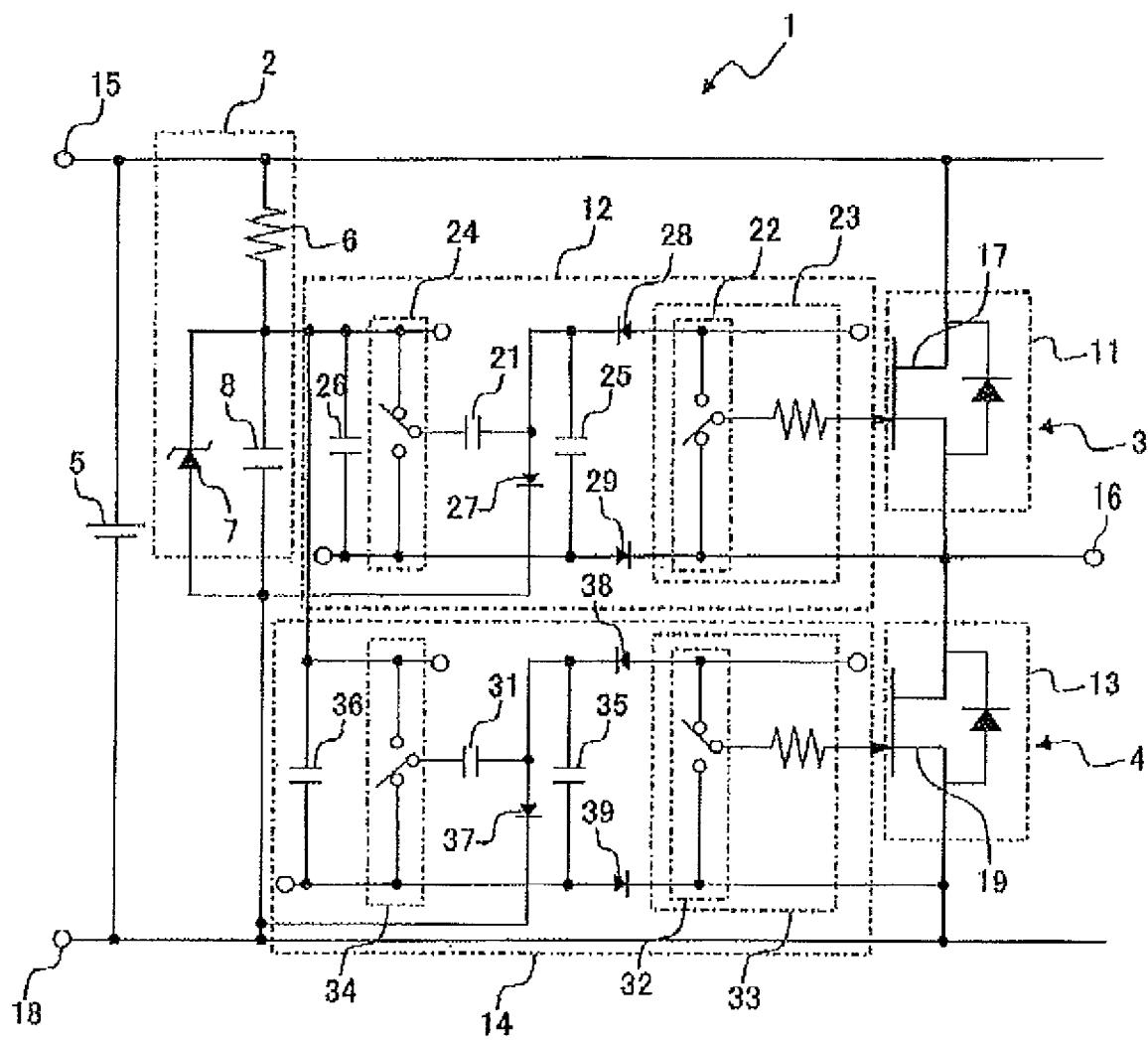
FIG. 1 is a circuit diagram illustrating a power converter according to a first embodiment of the invention.

FIG. 1 illustrates a first embodiment of a power converter 1. The power converter 1 of the present embodiment has an upper-and-lower arm structure, and has a voltage-dividing circuit 2 and upper and lower arms 3 and 4.

The voltage-dividing circuit 2 has a resistor 6, a zener diode 7 and a voltage holding capacitor 8. The voltage-dividing circuit 2, to which electricity is at first supplied from a main power source 5, generates a negative voltage for driving a control terminal of the switching devices 17 and 19, which will be described later. The voltage-dividing circuit 2 divides voltage of the electricity supplied from the main power source 5 by using the zener diode 7. The voltage-dividing circuit 2 stably generates a negative voltage to drive the conduction control terminal (i.e., a gate terminal of a switching device) by using the voltage holding capacitor 8.

The upper arm 3 is a switching circuit which has a main circuit 11 and a driving circuit 12. The driving circuit 12 drives the conduction control terminal of the switching device 17 of the upper arm 3. The lower arm 4 is a switching circuit which has a main circuit 13 and a driving circuit 14. A conduction control terminal driving circuit 14 (hereinafter called driving circuit 14) drives the conduction control terminal of the switching device 19 of the lower arm 4.

The main circuit 11 of the upper arm 3 has a switching device (upper arm switching device) 17 which has a collector terminal (high-voltage-side terminal) connected to a positive terminal (second terminal) 15 of the main power source 5 and has a source terminal (low-voltage-side terminal) connected to an output terminal 16. The upper arm switching device 17 performs switching operations with respect to the main power source 5. The main circuit 13 of the lower arm 4 includes a switching device (lower arm switching device) 19. The lower arm switching device 19 has a collector terminal, which is connected to the output terminal 16, and has a source terminal connected to a reference voltage terminal (first terminal) 18 of the main power source 5. The main circuit 13 is switched on and off with the lower arm switching device 19 to be connected with the main power source 5.

The switching devices 17 and 19 are alternately switched on to be connected with the main power source 5, and alternately switched off to be disconnected from the main power source 5. Since each of the switching devices 17 and 19 have normally-on characteristics, each of the switching devices 17 and 19 is switched on if a predetermined negative voltage is applied to be connected with the main power source 5. Each of the switching devices 17 and 19 is switched off if predetermined negative voltage is not applied to be disconnected from the main power source 5.

The driving circuit 12 may have the following components: a conduction control terminal power source capacitor 21 (hereinafter called power source capacitor 21) which is charged by the main power source 5 and discharges to provide a negative voltage to the conduction control terminal (i.e., a gate terminal) of the switching device 17 of the upper arm 3 without any other power source; a conduction control terminal driving control circuit 23 (hereinafter called driving control circuit 23) having a first half-bridge circuit 22 that functions as a first changeover switch; a second half-bridge circuit 24 that functions as a second changeover switch; a first half-bridge power source capacitor 25; and a second half-bridge power source capacitor 26.

A negative terminal (first terminal) of the power source capacitor 21 is connected to a reference voltage terminal 18 of the main power source 5 through a reverse-flow-preventing diode 27. The negative terminal of the power source capacitor 21 is connected to the gate terminal of the switching device 17 if the connection to the gate terminal of the switching device 17 is selected in the first half-bridge circuit 22. Therefore, a reverse-flow-preventing diode 27 is interposed between the power source capacitor 21 and the gate terminal. A positive terminal (second terminal) of the power source capacitor 21 is connected to a positive terminal of the voltage-dividing circuit 2. The positive terminal of the power source capacitor 21 is connected to a source terminal of the switching device 17 if the connection to the source terminal of the switching device 17 is selected in the second half-bridge circuit 24. Therefore, a reverse-flow-preventing diode 29 is connected between the power source capacitor 21 and the source terminal.

The first half-bridge circuit 22 and the second half-bridge circuit 24 operate in synchronization with each other. On switching operations of the first half-bridge circuit 22 and the second half-bridge circuit 24, the negative terminal of the power source capacitor 21 is disconnected with the gate terminal of the switching device 17, and the positive terminal of the power source capacitor 21 connected with the positive terminal of the voltage-dividing circuit 2. Then, the power source capacitor 21 starts to be charged.

The first half-bridge power source capacitor 25 is rechargeable with the main power source 5, and functions as a power source to drive the first half-bridge circuit 22. The second half-bridge power source capacitor 26 is also rechargeable with the main power source 5, and functions as a power source to drive the second half-bridge circuit 24.

The lower arm driving circuit 14 has the substantially same circuit structure as that of the upper arm driving circuit 12 and may have the following components: a power source capacitor 31 which is charged with the main power source 5 and discharges to provide a negative voltage to the gate terminal of the switching device 19 of the lower arm 4 without any other power source; a conduction control terminal driving control circuit 33 (hereinafter called driving control circuit 33) having a first half-bridge circuit 32 that functions as a first changeover switch; a second half-bridge circuit 34 that functions as a second changeover switch; a first half-bridge power source capacitor 35; and a second half-bridge power source capacitor 36.

A negative terminal (first terminal) of the power source capacitor 31 is connected to a reference voltage terminal 18 of the main power source 5 through a reverse-flow-preventing diode 37. The negative terminal of the power source capacitor 31 is connected to the gate terminal of the switching device 19 if the connection to the gate terminal of the switching device 19 is selected in the first half-bridge circuit 32. Therefore, a reverse-flow-preventing diode 38 is connected between the power source capacitor 31 the gate terminal. A positive terminal (second terminal) of the power source capacitor 31 is connected to a positive terminal of the voltage-dividing circuit 2. The positive terminal (second terminal) of the power source capacitor 31 is connected to a source terminal of the switching device 19 if the connection to the source terminal of the switching device 19 is selected in the second half-bridge circuit 34. Therefore, a reverse-flow-preventing diode 39 is connected between the power source capacitor 31 and the source terminal of the switching device 19.

The power source capacitor 31 arranged as described above operates in the same manner as the power source capacitor 21. That is, the power source capacitor 31 is charged while the connection between the negative terminal of the power source capacitor 31 and the gate terminal of the switching device 19 is maintained to be disconnected by using the first half-bridge circuit 32, and while the positive terminal power source capacitor 31 is maintained to be connected to the positive terminal of the voltage-dividing circuit 2 by using the first and second half-bridge circuit 34. The power source capacitor 31 also discharges to apply a negative voltage to the gate terminal of the switching device 19 while the negative terminal of the power source capacitor 31 is maintained to be connected to the gate terminal of the switching device 19 by the first half-bridge circuit 32, and while the positive terminal of the power source capacitor 31 is maintained to be connected to the source terminal of the switching device 19.

The first half-bridge power source capacitor 35 is rechargeable with the main power source 5. The first half-bridge power source capacitor 35 discharges to drive the first half-bridge circuit 32. The second half-bridge power source capacitor 36 is also rechargeable with the main power source 5. The second half-bridge power source capacitor 36 discharges to drive the second half-bridge circuit 34.

The half-bridge circuits 22, 24, 32 and 34 used in the present invention have a half-bridge structure such as ordinary MOSFETs and bipolar transistors. The half-bridge circuits 22 and 32 in the driving control circuits 23 and 33 control the connection and disconnection between the negative terminals of the power source capacitors 21 and 31 and the gate terminals of the switching devices 17 and 19 by alternately turning on and off the switching devices 17 and 19. The switching devices 17 and 19 are alternately switched on and alternately switched off by the half-bridge circuits 22 and 32 which operate in accordance with a control signal transmitted from a photo-coupler (not shown in the accompanying drawings) and the like. The control signal is also used for alternately switching the half-bridge circuits 24 and 34. Switching directions are opposite between the half-bridge circuits 22 and 32 and between the half-bridge circuits 24 and 34 as shown in FIG. 1.

Paths for applying driving voltages to the transistors of the half-bridge circuits 22, 24, 32 and 34 from the half-bridge power source capacitors 25, 26, 35 and 36 are omitted in the accompanying drawings.

Operations conducted by the above explained power converter 1 will be explained as follows. First of all, if a signal for turning on the switching device 17 and turning off the switching device 19 is inputted into the power converter 1, the switching state of the half-bridge circuits 22, 24, 32 and 34 becomes like shown in FIG. 1. In this state, the power source capacitor 21 is disconnected from the gate terminal of the switching device 17, and the gate terminal and the source terminal of the switching device 17 are short-circuited and the positive terminal of the power source capacitor 21 is connected to the positive terminal of the voltage-dividing circuit 2. On the other hand, the negative terminal of the power source capacitor 31 is connected to the gate terminal of the switching device 19, and the positive terminal of the power source capacitor 31 is connected to the source terminal of the switching device 19. The positive terminal of the power source capacitor 31 is disconnected from the main power source 5.

The switching device 17 is turned on when the negative voltage applied to its conduction control terminal is shut off. Simultaneously, the main power source 5 starts to charge the power source capacitor 21 not through the main circuits 11 and 13. The power source capacitor 31 supplies a negative voltage to the gate terminal of the switching device 19 to turn off the switching device 19.

In contrast to the operations described above and carried out based on the signal for turning on the switching device 17 and turning off the switching device 19, the switching directions of the half-bridge circuits 22, 24, 32 and 34 are reversed from the directions shown in FIG. 1 when a signal for turning off the switching device 17 and turning on the switching device 19 is inputted.

Second Embodiment

Figure 2:
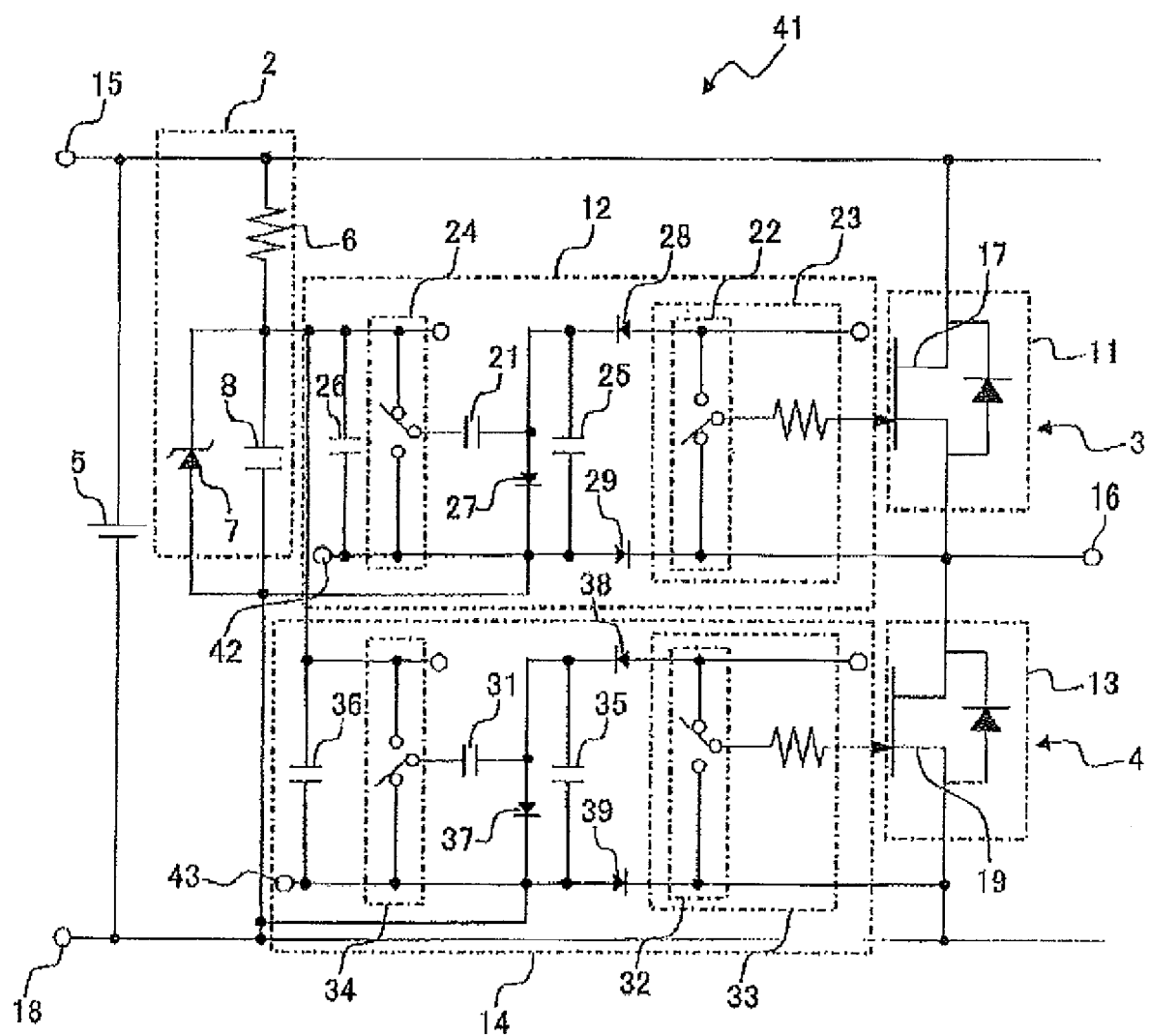
FIG. 2 is a circuit diagram illustrating a power converter according to a second embodiment of the invention.

FIG. 2 illustrates a power converter 41 according to a second embodiment. The power converter 41 has the same structure as that of the power converter 1 shown in FIG. 1, except that, in the power converter 41, a negative terminal 42 of the second half-bridge circuit 24 is connected to a cathode of the reverse-flow-preventing diode 27 and a negative terminal 43 of the second half-bridge circuit 34 is connected to a cathode of the reverse-flow-preventing diode 37. The components of the power converter 41 that are the same as those in the power converter 1 are denoted by the same reference numerals, and the abovementioned explanation for the power converter 1 will be applicable.

Figure 3:
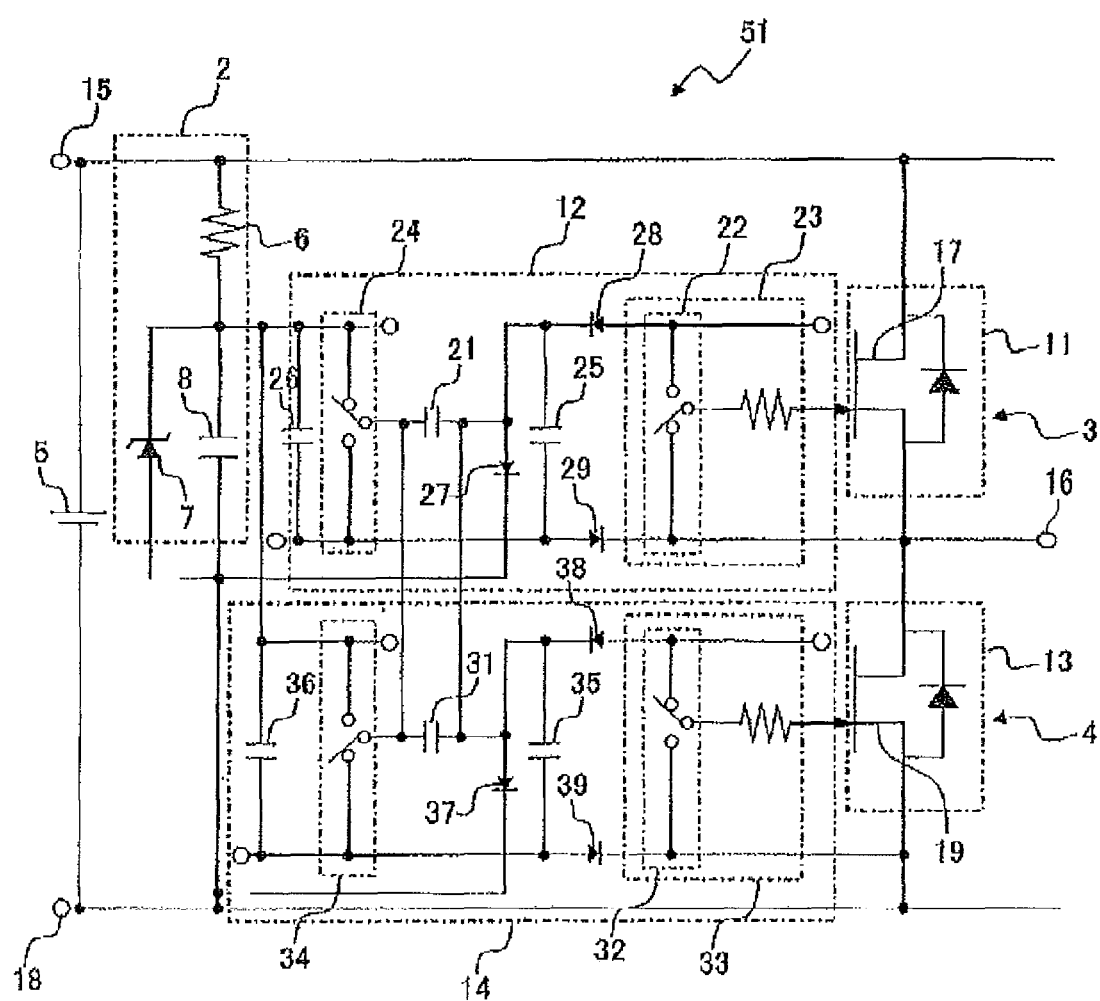
FIG. 3 is a circuit diagram illustrating a power converter according to a third embodiment of the invention.

FIG. 3 illustrates a power converter 51 according to a third embodiment. In the power converter 51, the power source capacitor 21 is connected in parallel with the power source capacitor 31 so that they can charge each other. That is, power source capacitor 21 and the power source capacitor 31 is charged not only by another of the power source capacitor 21 and the power source capacitor 31 but also by the main power source 5. Accordingly, this circuit structure provides more various power sources for charging each of the power source capacitors 21 and 31 continuously.

In the above explained power converters 1 and 41 of the embodiments 1 and 2, a time period for charging any one of the power source capacitors 21 and 31 is equal to a time period in which the switching devices 17 and 19 are kept on. Sometimes, in these embodiments, the power source capacitors 21 and 31 may be charged insufficiently if the switching devices 17 and 19 are operated with the on time which is kept relatively short. In contrast, the present embodiment providing more various power sources for charging electricity to the power source capacitors 21 and 31 can effectively prevent the power source capacitors 21 and 31 from being charged insufficiently.

The structure of the power converter 51 other than described above is the same as that of the power converter 1 in FIG. 1. The components of the power converter 51 that are the same as those in the power converter 1 are denoted by the same reference numerals, and the abovementioned explanation for the power converter 1 will be applicable.

Figure 4:
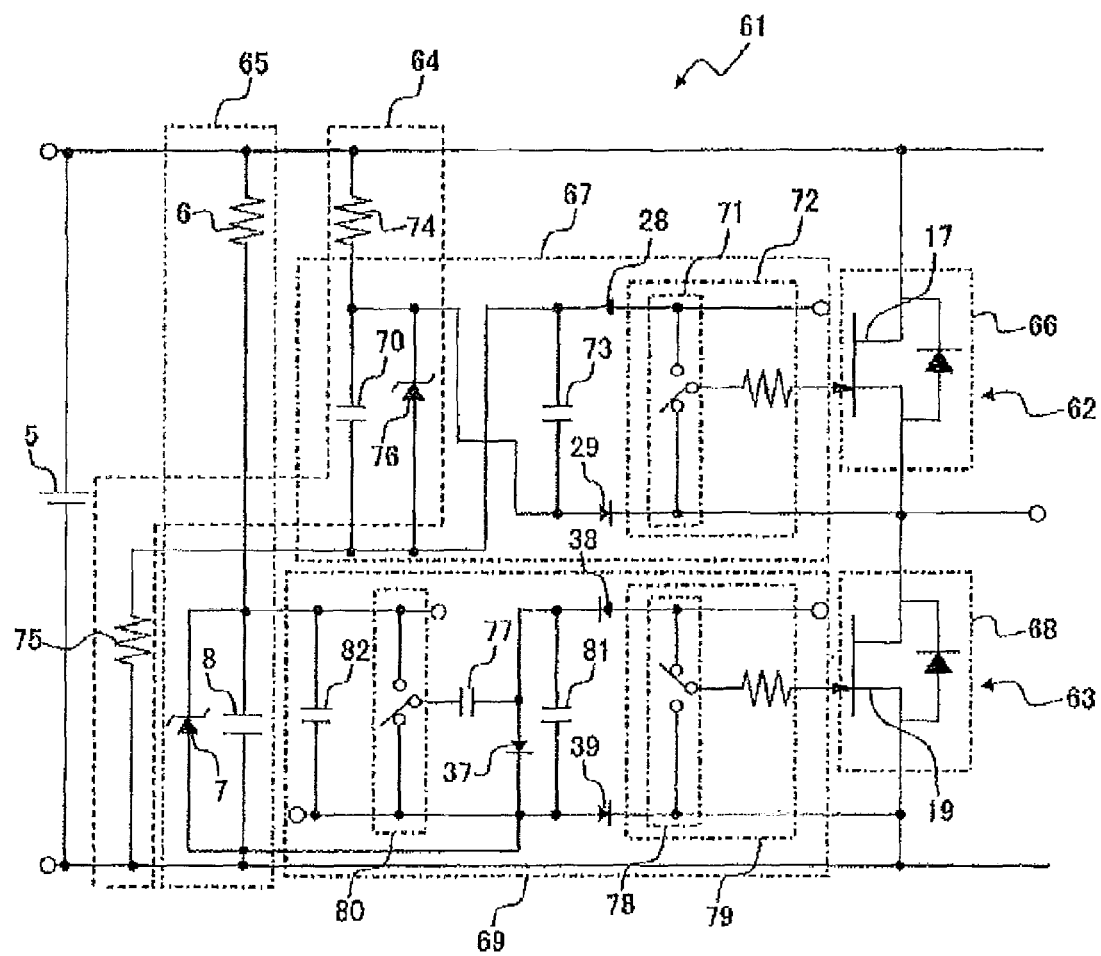
FIG. 4 is a circuit diagram illustrating a power converter according to a fourth embodiment of the invention.

FIG. 4 illustrates a power converter 61 according to a fourth embodiment. The power converter 61 according to the present embodiment has an upper arm 62 and a lower arm 63. A switching circuit of the upper arm 62 has a structure which is different from a switching circuit of the lower arm 63. The power converter 61 has upper and lower arm voltage-dividing circuits 64 and 65.

The upper arm 62 is a switching circuit which has an upper arm main circuit 66 and a circuit 67 for driving a conduction control terminal of the upper arm 62 (hereinafter called the driving circuit 67). The lower arm 63 is a switching circuit which has a lower arm main circuit 68 and a circuit 69 for driving a conduction control terminal of the lower arm 63 (hereinafter called the driving circuit 69). The lower arm 63 has a structure that is the same as the structure of the lower arm 4 shown in FIG. 1

The upper arm main circuit 66 has the same structure with the main circuit 11 in FIG. 1, and the lower arm main circuit 68 has the same structure with the main circuit 13 in FIG 1.

The components of the main circuits 66 and 68 that are the same as those in the main circuits 11 and 13 are denoted by the same reference numerals, and the abovementioned explanation for the main circuits 11 and 13 will be applicable.

The upper arm driving circuit 67 has the following components: a capacitor 70, which is charged with the power source 5, for applying a negative voltage to the gate terminal of the switching device 17 of the upper arm 62; a circuit 72; and an upper arm half-bridge power source capacitor 73. The circuit 72 has an upper arm half-bridge circuit 71 for switching the upper arm 62.

The capacitor 70 also maintains a voltage of the upper arm voltage-dividing circuit 64. More specifically, the upper arm voltage-dividing circuit 64 generates a voltage by means of the main power source 5. The upper arm voltage-dividing circuit 64 generates a voltage for driving the conduction control terminal of the switching device 17. The upper arm voltage-dividing circuit 64 has resistors 74 and 75, a zener diode 76, and the upper arm power source capacitor 70. The zener diode 76 generates a voltage for driving the conduction control terminal of the switching device 17 by dividing the voltage of electricity supplied by the main power source 5. The power source capacitor 70 stores the generated voltage stably. The power source capacitor 70 also functions as a capacitor for applying the upper arm conduction control terminal.

A negative terminal (first terminal) of the upper arm power source capacitor 70 is connected to the reference voltage terminal 18 of the main power source 5. The negative terminal of the upper arm power source capacitor 70 is connected to the gate terminal of the switching device 17 if the connection to the gate terminal of the switching device 17 is selected in the upper arm half-bridge circuit 71. Therefore, the reverse-flow-preventing diode 28 is connected between the gate terminal and the upper arm half-bridge circuit 71. A positive terminal (second terminal) of the upper arm power source capacitor 70 is connected to a positive terminal of the upper arm voltage-dividing circuit 64. Therefore, the reverse-flow-preventing diode 29 is connected between the source terminal of the switching device 17 and the positive terminal of the capacitor 70.

Since the power source capacitor 70 is connected to the main power source 5 directly, the power source capacitor 70 is charged continuously. The upper arm power source capacitor 70 is discharging to apply a negative voltage to the gate terminal while the negative terminal of the power source capacitor 70 is kept connected to the gate terminal of the switching device 17 by the upper arm half-bridge circuit 71.

The upper arm half-bridge power source capacitor 73 is rechargeable from the main power source 5. The upper arm half-bridge power source capacitor 73 discharges for driving the upper arm half-bridge circuit 71.

The lower arm driving circuit 69 has the same structure as that of the driving circuit 14 in FIG. 1. The lower arm driving circuit 69 has the following components: a lower arm power source capacitor 77; a lower arm driving control circuit 79 having a first lower arm half-bridge circuit 78; a second lower arm half-bridge circuit 80; a first lower arm half-bridge power source capacitor 81; and a second lower arm half-bridge power source capacitor 82. The lower arm power source capacitor 77, to which electricity is charged from the main power source 5, supplies a negative voltage to the gate terminal of the switching device 19.

A negative terminal (first terminal) of the lower arm power source capacitor 77 is connected to the reference voltage terminal 18 of the main power source 5 through the reverse-flow-preventing diode 37. The negative terminal of the lower arm power source capacitor 77 is connected to the gate terminal of the switching device 19 if the connection to the gate terminal of the switching device 19 is selected in the first lower arm half-bridge circuit 78. Therefore, the reverse-flow-preventing diode 38 is connected between the gate terminal of the switching device 19 and the negative terminal of the lower arm power source capacitor 77. A positive terminal (second terminal) of the lower arm power source capacitor 77 is connected to a positive terminal of the lower arm voltage-dividing circuit 65. The positive terminal (second terminal) of the lower arm power source capacitor 77 is connected to the source terminal of the switching device 19 if the connection to the source terminal of the switching device 19 is selected in the second lower arm half-bridge circuit 80. Therefore, the reverse-flow-preventing diode 39 is connected between the source terminal of the switching device 19 and the positive terminal of the lower arm power source capacitor 77.

The lower arm power source capacitor 77 operates in the same manner as the power source capacitor 31 in FIG. 1. That is, the first and second lower arm half-bridge circuits 78 and 80 operate in synchronization with each other. More specifically, the lower arm power source capacitor 77 is charged by disconnecting the negative terminal of the lower arm power source capacitor 77 with the gate terminal of the switching device 19 and by connecting the positive terminal of the lower arm power source capacitor 77 to a positive terminal of the lower arm voltage-dividing circuit 65. Also, the lower arm power source capacitor 77 discharges to apply a negative voltage to the gate terminal of the switching device 19 by connecting the negative terminal of the lower arm power source capacitor 77 to the gate terminal of the switching device 19 and by connecting the positive terminal of the lower aim power source capacitor 77 to the source terminal of the switching device 19.

The first lower arm half-bridge power source capacitor 81 is rechargeable with the main power source 5, and the first lower arm half-bridge power source capacitor 81 discharges for driving the first lower arm half-bridge circuit 78. The second lower arm half-bridge power source capacitor 82 is also rechargeable with the main power source 5. The second lower arm half-bridge power source capacitor 82 discharges for driving the second lower arm half-bridge circuit 80.

The lower arm voltage-dividing circuit 65 has the same circuit structure as that of the voltage-dividing circuit 2 shown in FIG. 1. The components of the lower arm voltage-dividing circuit 65 that are the same as those in the voltage-dividing circuit 2 are denoted by the same reference numerals as those shown in FIG. 1, and the abovementioned explanation will be applicable.

The above explained power converter 61 operates as follows. First of all, if a signal for turning on the switching device 17 and turning off the switching device 19 is inputted into the power converter 61, the switching state of the half-bridge circuits 70, 71, and 78 becomes like shown in FIG. 4. In this state, the negative terminal of the upper arm power source capacitor 70 is disconnected from the gate terminal of the switching device 17, the gate terminal and the source terminal of the switching device 17 are short-circuited. Also, when the negative terminal of the lower arm power source capacitor 77 is connected to the gate terminal of the switching device 17, and when the positive terminal of the lower arm power source capacitor 77 is connected to the source terminal of the switching device 19, the positive terminal of the lower arm power source capacitor 77 is disconnected from the main power source 5.

In this state, the switching device 17 is turned on because the negative voltage applied to the gate terminal is stopped. Simultaneously, the lower arm power source capacitor 77 applies a negative voltage to the gate terminal of the switching device 19, and accordingly, the switching device 19 is turned off.

While the operations described above are carried out when the signal that turns on the switching device 17 and turns off the switching device 19 is inputted, the respective switching states of the half-bridge circuits 71, 78 and 80 are all reversed and operation states corresponding to that will be brought about when a signal that turns off the switching device 17 and turns on the switching device 19 is inputted.

In the power converter 61 of the present embodiment, the structure of the switching circuit of the upper arm 62 is different from the structure of the switching circuit of the lower arm 63. This structural difference is advantageous since the reverse-flow-preventing diode 29 of the power converter 61 may have a voltage resistance lower than that of the power converter 1 shown in FIG. 1.

Figure 5:
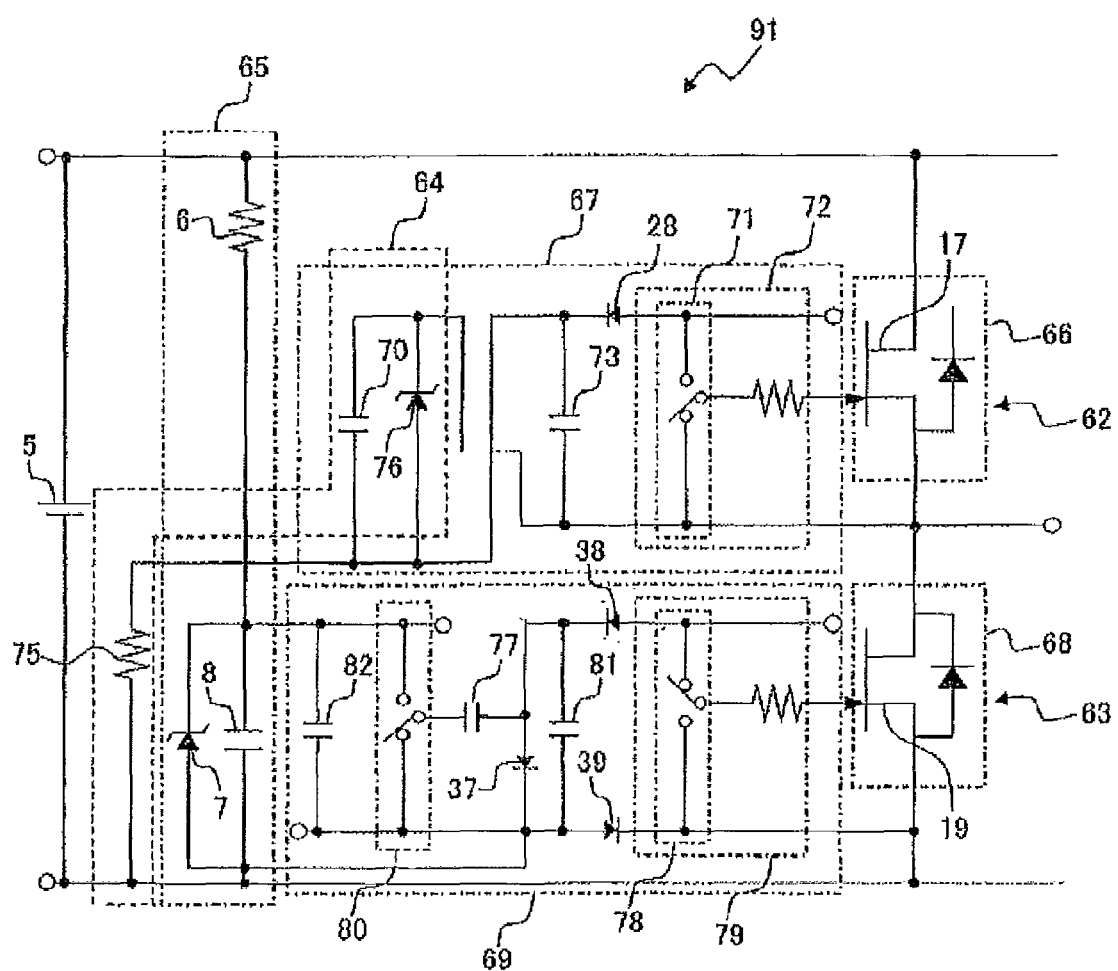
FIG. 5 is a circuit diagram illustrating a power converter according to a fifth embodiment of the invention.

FIG. 5 illustrates a power converter 91 according to a fifth embodiment of the present invention. In the power converter 91 of the present embodiment, the switching device 17 is interposed between the positive terminal of the upper arm power source capacitor 70 and the main power source 5 so that an electricity, which is to be supplied to the upper arm power source capacitor 70, flows through the switching device 17. Therefore, in the power converter 91, the electricity is charged to the upper arm power source capacitor 70 while the switching device 17 is kept turned on. In this configuration of the power converter 91, the resistor 74 shown in FIG. 4 can be omitted from the power converter 61.

Except for the above explained difference, the structure of the power converter 91 according to the fifth embodiment is the same as that of the power converter 61 shown in FIG. 4. The components of the power converter 91 that are the same as those of the power converter 61 are denoted by the reference numerals that are the same as those shown in FIG. 4, and the abovementioned explanation will be applicable.

Figure 6:
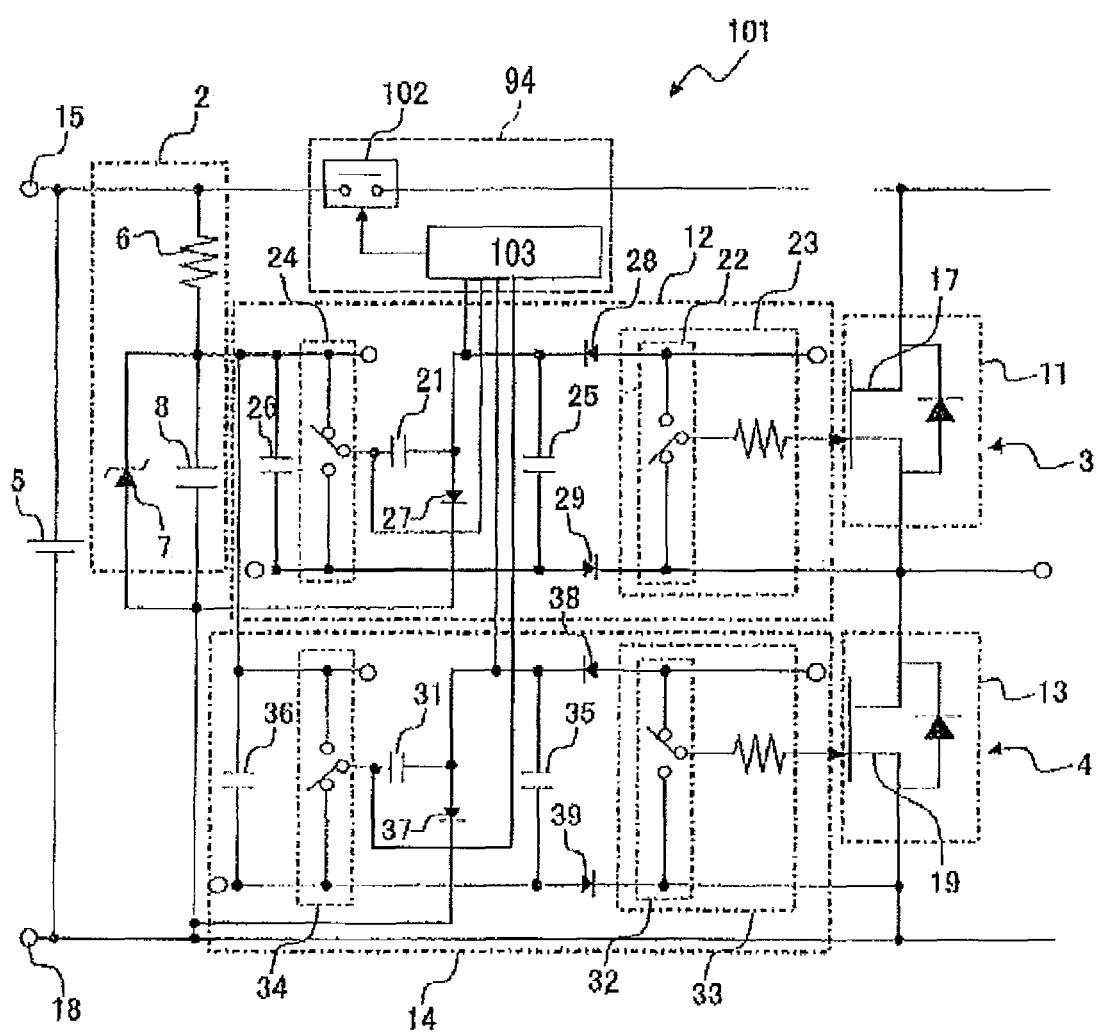
FIG. 6 is a circuit diagram illustrating a power converter according to a sixth embodiment of the invention.

FIG. 6 illustrates a power converter 101 according to a sixth embodiment of the present invention. The power converter 101 has a protection circuit 94 having a relay switch 102 and a relay control circuit 103. The relay switch 102, which may be a mechanical relay switch or a semiconductor relay switch, is connected between the main power source 5 and the switching devices 17, 19. The relay switch 102 connects the switching devices 17 and 19 to the main power source 5, and disconnects the switching devices 17 and 19 from the main power source 5. The relay control circuit 103 detects capacitor voltages of the power source capacitors 21 and 31 and switches on the relay switch 102 or switches off the relay switch 102 based on the detected capacitor voltages. More specifically, the relay control circuit 103 switches on the relay switch 102 if the both of the capacitor voltages of the power source capacitors 21 and 31 reach a predetermined threshold value. That is, the power converter 101 turns off the relay switch 102 unless either one of the capacitor voltages of the power source capacitors 21 and 31 reaches the predetermined threshold value.

If any failure occurs at a starting time or later in the driving circuits 12 and 14 in the power converter 101, the power source capacitors 21 and 31 may not be charged sufficiently, and accordingly, voltages of the power source capacitors 21 and 31 are not sufficiently large. More specifically, the switching devices 17 and 19 have the normally-on characteristics, and a certain negative voltage must be applied to the gate terminals of the switching devices 17 and 19 to turn off the switching devices 17 and 19. Therefore, the switching devices 17 and 19 may be short-circuited and damaged if negative voltages to be applied to the gate terminals are insufficient due to insufficient electricity charged to the power source capacitors 21 and 31 and if the switching devices 17 and 19 are connected to the main power source 5 in this state.

The protection circuit 94 is a fail-safe component provided for effectively preventing the above-explained undesirable case by controlling the connection and disconnection of the switching devices 17 and 19 to the main power source 5 by using the relay switch 102 and the relay control circuit 103.

The circuit structure other than that described above of the power converter 101 is the same as that of the power converter 1 in FIG. 1. Accordingly, the components of the power converter 101 that are the same as those of the power converter 1 are denoted by the same reference numerals shown in FIG. 1, and the abovementioned explanation will be applicable.

While the embodiments for carrying out the invention have been described above, they are merely typical examples and the invention may be carried out in various modes within the scope not departing from the spirit of the invention.

For instance, although each embodiment described above relates to the power converter having the upper and lower arm structure, the power converter having the upper and lower arms has been explained just for convenience, and needless to say, the invention is applicable to a power converter having a single-arm structure such as a boost chopper for example. The switching device having the normally-on characteristics as the switching device has been explained in each embodiment described above. One of the main feature of the present invention is that an electricity, which is to be charged to conduction control terminal, flows not through switching devices of main circuit, Therefore, the present invention is applicable to a switching circuit and a power converter using a switching device which can be turned on by applying a positive voltage to a conduction control terminal.

What is claimed is:

1. A switching circuit comprising:
a main power source having a first power source terminal and a second power source terminal;
a power source capacitor rechargeable with the main power source, the power source capacitor having a first terminal and a second terminal, the first terminal being connected with the first power source terminal, the second terminal being connected with the second power source terminal;
a switching device, which has normally-on characteristics, having a conduction control terminal to which a voltage is applied with the power source capacitor, the switching device having a low voltage terminal;
a first changeover switch for connecting the first terminal of the power source capacitor to the conduction control terminal if the connection to the conduction control terminal is selected in the first changeover switch; and
a second changeover switch for connecting the second terminal of the power source capacitor to the low voltage terminal if the connection to the low voltage terminal is selected in the second changeover switch; and
a diode connected between the second terminal of the power source capacitor and the low voltage terminal,
wherein the power source capacitor is rechargeable by disconnecting the first terminal of the power source capacitor and by connecting the second terminal of the power source capacitor to the main power source, and
wherein the power source capacitor applies a voltage to the conduction control terminal by connecting the first terminal of the power source capacitor to the conduction control terminal and by connecting the second terminal of the power source capacitor to the low voltage terminal.

2. The switching circuit according to claim 1, further comprising a voltage generating circuit for generating the voltage applied to the conduction control terminal with the main power source, wherein the conduction control terminal power source capacitor is recharged with the voltage generating circuit.

3. The switching circuit according to claim 1 or 2, wherein the first and second changeover switches function as half-bridge circuits.

4. The switching circuit according to claim 3, further comprising half-bridge power capacitors, rechargeable with the main power source, for driving the first and second changeover switches.

5. The switching circuit according to one of claim 4, further comprising: a relay switch connected between the main power source and the switching device; and a relay control circuit for controlling operations of the relay switch, wherein the relay control circuit switches on the relay switch if a voltage in the power source capacitor satisfies a predetermined threshold value, or if a voltage in the half-bridge power capacitor of the first changeover switch meets a predetermined threshold value.

6. The switching circuit according to one of claim 3, further comprising: a relay switch connected between the main power source and the switching device; and a relay control circuit for controlling operations of the relay switch, wherein the relay control circuit switches on the relay switch if a voltage in the power source capacitor satisfies a predetermined threshold value, or if a voltage in the half-bridge power capacitor of the first changeover switch meets a predetermined threshold value.

7. The switching circuit according to one of claims 1 or 2, further comprising:
a relay switch connected between the main power source and the switching device; and
a relay control circuit for controlling operations of the relay switch,
wherein the relay control circuit switches on the relay switch if a voltage in the power source capacitor satisfies a predetermined threshold value, or if a voltage in the half-bridge power capacitor of the first changeover switch meets a predetermined threshold value.

8. A switching circuit comprising:
an upper arm and a lower arm;
a main power source having a first power source terminal and a second power source terminal;
power source capacitors, each provided in the upper and lower arms, each power source capacitor being rechargeable with the main power source, each power source capacitor having a first terminal and a second terminal, each first terminal being connected with the first power source terminal, each second terminal being connected with the second power source terminal;
switching devices, which have normally-on characteristics, each provided in the upper and lower arms, each switching device having a conduction control terminal to which a voltage is applied by the power source capacitor, each normally-on switching device having a low voltage terminal;

first changeover switches, each provided in the upper and lower arms, for connecting the first terminals of the power source capacitors to the conduction control terminals if the connections to the conduction control terminals are selected in the first changeover switches; and second changeover switches, each provided in the upper and lower arms, for connecting the second terminals of the power source capacitors to the low voltage terminals if the connections to the low voltage terminals are selected in the second changeover switches; and diodes, each connected between the second terminal of the power source capacitor and the low voltage terminal in each arm, wherein the power source capacitors are rechargeable by disconnecting the first terminals of the power source capacitors and by connecting the second terminals of the power source capacitors to the main power source, and wherein the power source capacitors apply voltages to the conduction control terminals by connecting the first terminals of the power source capacitors to the conduction control terminals and by connecting the second terminals of the power source capacitors to the low voltage terminals.

9. The switching circuit according to claim 8, wherein the power source capacitors are rechargeable with each other.

10. A switching circuit comprising:

an upper arm and a lower arm;

a main power source having a first power source terminal and a second power source terminal;

an upper arm switching device, which is a normally-on device, provided in the upper arm, the upper arm switching device having an upper arm conduction control terminal to which a voltage is applied by the power source capacitor, the upper arm switching device having a low voltage terminal;

a lower arm switching device, which is a normally-on device, provided in the lower arm, the lower arm switching device having a lower arm conduction control terminal to which a voltage is applied by the lower arm power source capacitor, the lower arm switching device having a low voltage terminal;

an upper arm power source capacitor, provided in the upper arm, the upper arm power source capacitor being rechargeable with the main power source, the upper arm power source capacitor having a first terminal and a second terminal, the first terminal of the upper arm power source capacitor being connected with the first power source terminal, the second terminal of the upper arm power source capacitor being connected with the second power source terminal through a diode and being connected to the low voltage terminal of the upper arm switching device;

a lower arm power source capacitor, provided in the lower arm, the lower arm power source capacitor being rechargeable with the main power source, the lower arm power source capacitor having a first terminal and a second terminal, the first terminal of the lower arm power source capacitor being connected with the first power source terminal, the second terminal of the lower arm power source capacitor being connected with the second power source terminal through a diode and being connected to the low voltage terminal of the upper arm switching device;

an upper arm changeover switch, provided in the upper arm, for connecting the first terminal of the upper arm power source capacitor to the conduction control terminal of the upper switching device if the connection to the conduction control terminal of the upper switching device is selected in the upper arm changeover switch;

a lower arm first changeover switch, provided in the lower arm, for connecting the first terminal of the lower ami power source capacitor to the conduction control terminal of the lower arm normally-on switching device if the connection to the conduction control terminal of the lower switching device is selected in the lower arm first changeover switch; and a lower arm second changeover switch, provided in the lower arm, for connecting the second terminal of the lower arm power source capacitor to the low voltage terminal of the lower arm switching device via a lower arm diode if the connection to the low voltage terminal of the lower switching device is selected in the lower arm second changeover switch;

wherein the upper arm power source capacitor discharges to apply a voltage to the conduction control terminal of the upper arm switching device by connecting the first terminal of low voltage terminal the upper arm power source capacitor to the conduction control terminal of the upper arm switching device, wherein the lower arm power source capacitor is charged by disconnecting the first terminal of the lower arm power source capacitor with the conduction control terminal of the lower arm normally-on switching device and by connecting the second terminal of the lower arm power source capacitor to the main power source, and wherein the lower arm power source capacitor discharges to apply a voltage to the conduction control terminal of the lower arm normally-on switching device by connecting the first terminal of the lower arm power source capacitor to the conduction control terminal of the lower arm normally-on switching device and by connecting the second terminal of the lower arm power source capacitor to the low voltage terminal of the lower arm power source capacitor.

11. The switching circuit according to claim 10, wherein the second terminal of the upper arm power capacitor is connected to a second terminal of the main power source through the upper arm switching device.

* * * * *